June 10, 1930.  J. J. KANE  1,763,616
POWER SYSTEM
Filed April 23, 1923
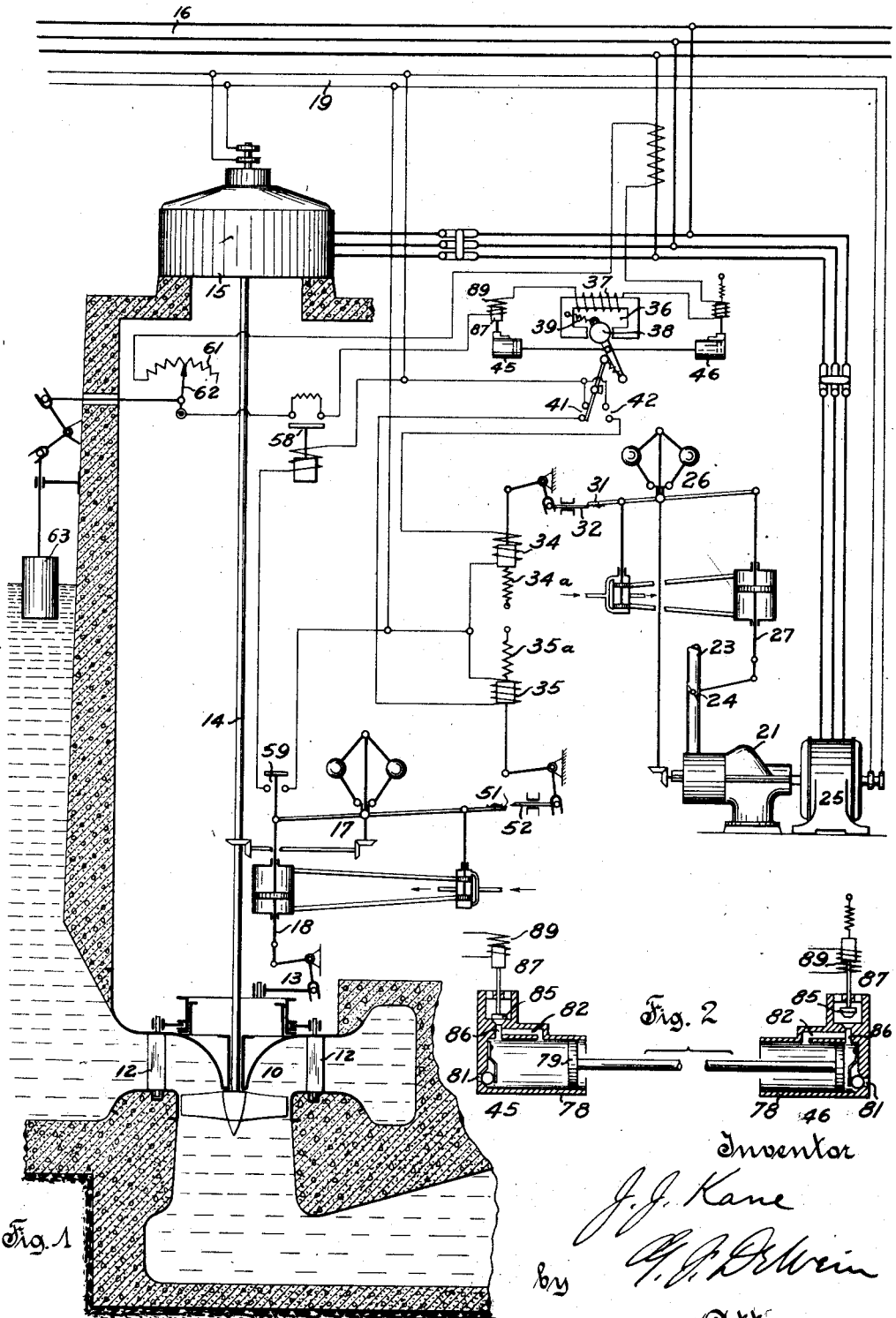

Patented June 10, 1930

1,763,616

UNITED STATES PATENT OFFICE

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

POWER SYSTEM

Application filed April 23, 1923. Serial No. 633,898.

The present invention relates in general to power installations, and has more particular relation to the provision of apparatus for facilitating the production and utilization of power from a plurality of sources in an economical manner.

It frequently happens that certain sources of power are available in certain localities at relatively low cost, but such power is not available in an amount which will economically supply the entire demands of a variable load or, even if capable of supplying such load, economical operation may require that at least a portion, ordinarily variable, of the total load be supplied from a second source. By utilizing the several power sources or prime-movers for driving individual electrical generators which are connected to supply a common distribution circuit, the energy of any one of several of the power sources may readily be made available at points quite distant from the location of the power sources.

If no provisions are made to prevent it, the several sources of power, when arranged to drive a common load, especially when the sources are arranged to drive electrical generators, will tend to divide the total load on the system proportionately. However, in view of the fact that the economy and efficiency of operation of the several prime movers and the generators associated therewith are a maximum at or near full load, and more especially in order to utilize economically the maximum amount of power available from the source which produces power at the lower cost, it is desirable that means be provided for insuring that the maximum amount of power be drawn from the source which produces at the lower cost.

The present invention contemplates a power system especially adapted for the economical production and utilization of power from a plurality of sources one of which is capable of producing or furnishing power at a relatively low cost, such as a hydraulic turbine, and the other of which may be a steam engine or turbine or an oil or gas engine unit, or ordinarily a source wherein the amount of power produced is directly proportional to the amount of fuel supplied or consumed, and hence the cost of producing power from this latter source is directly dependent upon the cost of the fuel consumed. The invention further contemplates the automatic control of the system to insure that the maximum power that may be economically supplied from one source, such as a hydraulic turbine, is produced thereby before any appreciable amount of power is supplied by or drawn from the second or auxiliary source of power, the latter being controlled so as to supply only the variable excess beyond the maximum which the primary source can economically supply; and the invention includes automatically operative devices for varying the maximum power supplied by the primary source in accordance with the amount of power available for production or transformation by such source, or in accordance with or in response to other predetermined conditions, to the final end that this source of power may supply the power requirements of the system to the maximum economical capacity of the primary source.

An object of this invention is to provide a power installation of improved design embodying a plurality of sources of power and controlling means for insuring that one of the sources supplies the load requirements of the system up to a predetermined maximum value and one or more additional sources of power are called upon only for the purpose of supplying power requirements beyond this predetermined maximum.

A further object of this invention is to provide a power installation of improved design embodying a plurality of sources of power and automatically operative controlling means for insuring that one or more power sources supplies the load requirements up to a predetermined maximum value and an additional power source is called upon to supply power only when this predetermined maximum is exceeded, the controlling means including automatically operative devices for varying the maximum power or load that may be carried by the primary source or sources of power.

A further object of this invention is to provide a power installation of this improved character and design, embodying a primary source of power and a secondary source of power, both power sources supplying a common load, and controlling devices therefor automatically operative in response to the energy available at the primary source for varying the power value at which the secondary source of power is permitted to supply energy to the common load.

These and other objects and advantages are attained by the present invention, novel features of which will be apparent from the description and drawings herein, disclosing an embodiment of the invention, and will be more particularly pointed out in the claims.

In the accompanying drawings:

Fig. 1 is a diagrammatic showing of a power installation involving features of the present invention.

Fig. 2 is a showing of a detail of the installation disclosed in Fig. 1.

In accordance with the diagrammatic disclosure of the drawings, a primary source of power is shown as a hydraulic turbine 10 provided with guide-vanes 12 or equivalent inlet controlling devices for controlling the supply of motive fluid, the guide-vanes being actuated by any suitable mechanism, indicated at 13, to vary the quantity of water supplied to the runner on the turbine shaft 14. An alternating current, synchronous generator 15, here shown as being of the rotating-field type and direct-connected to the turbine shaft, supplies energy to the alternating current distribution line 16. The turbine may be controlled for the purpose of maintaining constant speed under variable load and head conditions, by a speed governor 17 of an ordinary design of compensated governor, which causes the operation of an actuating rod 18, through a servo-motor, and the consequent operation of operating mechanism 13 which actuates the movable guide-vanes 12 at the turbine inlet. The rotating field of the generator 15 is supplied with direct current from the direct current supply line 19.

A secondary source of power is disclosed in the form of a steam turbine 21 whose inlet 23 is controlled by a throttle 24, the turbine driving, preferably through direct connection, a synchronous, alternating current generator 25 whose rotating field member is supplied from the direct current supply line 19, and whose stationary armature is adapted to supply current to the alternating current distribution circuit 16. A speed governor 26 is provided, the same being of an ordinary compensated type and capable of actuating a rod 27 which controls the throttle 24 of the steam turbine, so as to insure operation of the latter at a predetermined speed, corresponding to the normal frequency of the distribution line 16.

During a considerable portion of the period of operation, the throttle 24 is held in closed position or against a stop which permits a minimum amount of steam to pass through the turbine, preferably only enough to maintain the turbine in operating condition without furnishing any appreciable load, so as to practically float the generator 25 on the line circuit 16. This condition is attained through the engagement of a stop 31, associated with the actuating lever of the governor 17, with a latch 32, this latching effect serving to hold the throttle in substantially closed position against any tendency toward opening in response to the action of the governor on slowing down of the turbine. This provision insures against tendency of the hydraulic turbine 10 and its generator and the steam turbine 21 and its generator to share the total load equally or proportionally.

The latch 32 is normally biased to and maintained in the latching position indicated; and the latch is movable and held out of latching position by the action of an electromagnet 34 operatively connected to the latch. The latch is held in its normal or biased position by the action of a spring 34ª associated with the electromagnet. The circuit of the energizing winding of the electromagnet 34 is completed by a device 36 operable in response to the load on the distribution circuit 16. This load or power responsive device 36 includes a field element 37 whose winding carries current proportional to the load on the circuit 16 and an armature 38 shiftable, against the action of a retarding device such as a spring 39, to break the circuit of the winding of the electromagnet 34 at the switch 42 and to complete the circuit of the winding of an electromagnet 35, referred to hereinafter, at the switch 41, when the load on the circuit 16 exceeds a predetermined amount. The movable part of the switch element 41, 42 is preferably so arranged as to be operated in both directions with a snap action, as indicated.

In order to insure that the steam turbine 21 and its generator 25 will operate only to supply the excess requirements of the load on the system, and that the hydraulic turbine 10 and its generator 15 will not give up any portion of its full or other predetermined load to the steam turbine, the actuating rod 18 which actuates the guide-vane operating mechanism 13 of the turbine 10, is prevented from operating by a stop 51 associated with the governor lever and engageable by a latch 52 when the guide-vanes are in full-open or other predetermined position, corresponding to the full or other predetermined load on the turbine 10, to insure that the latter supplies this maximum and predetermined power when the steam turbine 21 is assisting in carrying the total load on the system. This latch is shown in the drawings in its unlatched position, permitting control of the guide-vanes 12 in response to slight variations in the speed of the turbine and its governor 17. The latch 52 is moved into and held in unlatched position, as indicated, by the electromagnet 35 whose energizing circuit is completed through the switch 41 associated with the power responsive device 36. The latch 52 is biased to and movable into and held in latched position by a spring 35ᵃ associated with the electromagnet 35.

In order to secure the operation of the latches 32 and 52 into and out of latching position only when the increase and decrease in load on the circuit 16 has persisted for a predetermined time-interval, retarding devices are provided. As indicated, these devices, in the form of dash-pot devices 45 and 46, are associated with the movable armature 38 of the load responsive device 36 which actuates the switch element 41, 42 to control the energizing circuits of the electromagnets 34 and 35. The dash-pot device 45 is so associated with the movable armature 38 as to retard movement thereof in the direction which causes opening of the switch 41 and closure of the switch 42; and the dash-pot device 46 is correspondingly arranged to retard opening of the switch 42 and closure of the switch 41. The time-element devices 45 and 46 may be of the definite, inverse or inverse-definite type, as desired, being preferably of the latter type as will be explained hereinafter.

In order to insure that the turbine 10 and its generator 15 are producing power at the maximum predetermined rate at the time when the governor or regulator of the steam turbine 21 is released to permit this turbine to assist in carrying the load, the energizing circuit of the power responsive device 36 is completed through an electromagnetic switch 58 whose energizing circuit is closed through a switch 59 associated with the rod 18, only when the actuating rod 18 is in a position corresponding to the predetermined maximum opening of the guide-vanes 12 or maximum power of the hydraulic turbine.

In order to provide for a variable amount of power available at the hydraulic turbine inlet, due to variation in head or pressure on the turbine, and to the end that the maximum amount of power available at this turbine may be utilized at any or all times or only at predetermined times, before the steam turbine is permitted to furnish a portion of the total load, the energizing circuit of the power responsive device 36 has included therein a controller, here shown in the form of a variable resistance in the form of a rheostat 61, the movable arm 62 of which is automatically operable, through mechanical or other connections, by a float 63 responsive to the head on the turbine or by any other suitable device automatically responsive to the power available at the turbine inlet or to any other predetermined condition. The action of the float 63 is to increase the resistance of the energizing circuit of the power responsive device 36 as the head on the turbine increases, and vice versa, and generally, to insure the desired operation of the power responsive device only when the total load on the circuit 16 is of the maximum value which it can safely or economically carry or is otherwise intended to carry for the particular conditions.

The drawings may be considered as disclosing the condition of the system when the total load on the circuit 16 is less than the predetermined maximum which the hydraulic turbine 10 and its generator 15 can furnish. At this time, the governor 26 is prevented by the latch 32 from exercising its controlling function on the throttle of the steam turbine, the latter being in substantially closed condition; and the latch 52 is withdrawn from the stop 51 associated with the inlet-controlling means of the hydraulic turbine 10, and consequently the latter is controlled so as to maintain the required speed for variable load conditions up to the predetermined maximum.

One can assume that the load on the hydraulic turbine has increased and it is operating at maximum gate-opening, at which time the switch 59 has closed the energizing circuit of the switch 58 which in turn completes the energizing circuit of the power responsive device 36. If now the total load on the circuit 16 exceeds that for which the power responsive device 36 is set, the armature of the latter is actuated after the required time-interval to open the switch 41 and close the switch 42, causing energization of the electromagnet 34 and de-energization of the magnet 35. The latch 52 is moved by its actuating spring 35ᵃ, into latching position wherein it holds the inlet gates of the turbine 10 in full-open or other predetermined position, and the latch 32 is moved into unlatched position, thus permitting the governor 26 to open the throttle of the steam turbine 21 and insuring that the latter will supply any excess load requirements.

When the total load on the system falls below the predetermined or maximum output of the hydraulic turbine 10, the power responsive device 36 is actuated after the predetermined or required time-interval, to open the switch 42 and close the switch 41; and this results in energizing the magnet 35 and de-energizing the magnet 36, and the latch 32 is operated, by the actuating spring 34ᵃ, to latching position, for the stop 31 is now drawn up to its highest position since the steam turbine is furnishing a minimum load, and the latch 52 is withdrawn by its electromagnet 35 from latching position, thus permitting the governor 17 of the hydraulic turbine to exercise the required control to insure that this turbine carries the lighter load at the required speed. As the rod 18 rises and the gates of the hydraulic turbine 10 are closed, the switch 59 is opened, thus causing opening of the switch 58 and the energizing circuit of the power responsive device 36.

As the float 63 moves up or down in response to variable head on the hydraulic turbine, the arm 62 of the rheostat 61 is shifted to increase or decrease, respectively, the resistance of the circuit of the energizing winding of the power responsive device 36 and, consequently, the value of load on the circuit 16 at which this device is operative to permit the steam turbine 21 to assist in carrying the load.

As indicated in Fig. 2, each of the retarding devices 45 and 46 may conveniently be in the form of a dash-pot cylinder 78 having a plunger 79 therein which is retarded during the initial part of its stroke toward the closed end of the dash-pot. An air inlet port 81 is provided through the closed end of the dash-pot, with a check-valve which prevents the discharge of air therethrough from the dash-pot but readily permits admission of air at the rear side of the plunger. A port 82 is provided in the wall of the dash-pot which, when the plunger passes a certain point in its travel toward the closed end of the dash-pot permits free discharge of air from such closed end, and thus permits substantially unrestrained movement of the plunger during the final portion of its travel. This unretarded final movement of the plunger is preferably utilized for producing effective operation of the movable part of the switch device.

In order to provide for greater refinement in the operation of the system, the dash-pot 45 which provides the time element involved in the unlatching or releasing of the governor control of the steam turbine 21 may be provided with a valve 85 controlling a passage 86 at its closed end, which provides a variable time interval in the effective operation of the plunger and the latches actuated therewith. As indicated, the passage 86 communicates with the exterior of the dash-pot, and the operation of the valve to its several positions may be produced by an electro-magnet 87 whose winding 89 carries current proportional to the load current which causes the operation of the load responsive device 36. The valve is normally biased to closed or nearly closed position, and is opened to a variable degree to provide a variable time element in the initial operation of the plunger toward the closed end of the casing, in response and in proportion to the excess of the load current in the energizing coil 89 above the limiting value corresponding to maximum load on the hydraulic turbine. With this arrangement, the time element involved in the operation of the plunger is inversely proportional to the value of the load current above this predetermined limiting value. With appropriate design of the valve, the maximum opening thereof may be limited so as to provide a minimum definite time interval in the operation of the plunger which will be substantially the same independently of the value of the load current above a certain limiting value.

While an ordinary use or embodiment of the invention is described herein in connection with a main unit or source of power in the form of a hydraulic turbine and a secondary or auxiliary source of power in the form of a steam turbine, it will be obvious that features of this invention are applicable to the control of other types of power sources such as a plurality of hydraulic turbines as the main and auxiliary sources of power, where the production of power at one station is more economical than at another or of a plurality of steam turbines or engines, or oil or gas-driven engines, or to any combination of the various types of power sources. Likewise, as to certain features of the invention, the main source of power may correspond to a generator or the distribution line of a central power station, and the auxiliary source may correspond to a local power station, and the automatically operative means may be effective to vary the maximum power that it is desirable to draw from one or the other of the station lines. It will be apparent that in any case, the system may be controlled automatically so as to vary this predetermined maximum power desired or required from one source, in response to power available at said source or in response to other predetermined conditions.

It will be apparent that instead of a float or other means responsive to head on the hydraulic turbine 10, as the means for automatically varying the maximum power to be produced or transformed at one source, any other type of automatic device may be used which is responsive in whole or in part to time or a characteristic of the electrical load on another part of the main or a local distribution circuit.

It should be understood that it is not desired that the invention claimed be limited to the exact details of construction shown and described, for obvious modifications will appear to a person skilled in the art to which this invention relates.

It is claimed and desired to secure by Letters Patent:

1. In an electrical power system, a plurality of sources of electrical energy, automatically operative means responsive to the electrical power produced by one of said sources for limiting to a predetermined value the load that may be supplied by said latter source, and automatically operative means responsive to a condition attendant upon the operation of said system for varying said load limiting value.

2. In an electrical power system, a plurality of sources of electrical energy, a prime mover drivingly associated with one of said sources of electrical energy, means responsive to the electrical power produced through said prime mover for limiting the load that may be carried by said prime mover, means for regulating said prime mover to cause it to produce and care for any varying power requirements of said system up to said load limiting value, and automatically operative means responsive to the energy available for conversion at said prime mover for varying said load limiting value.

3. In an electrical power system, a plurality of sources of electrical power each comprising a prime mover connected in driving relation to a synchronous alternating current generator for supplying said system, means for controlling the prime mover of one of said power sources to cause the latter to operate at substantially constant speed, automatically operative means responsive to the load on said system for insuring that one power source supplies substantially the entire load requirements of said system up to a predetermined limiting value thereof and that a second power source becomes operative when the load exceeds said limiting value to supply power requirements of the load only in excess of said limiting value, and automatically operative means directly responsive to a characteristic of the power available for conversion at said first power source for causing variation in the limiting value at which said second power source becomes operative to supply the load.

4. In combination, a prime mover driving an alternating current synchronous generator, an auxiliary prime mover driving an auxiliary alternating current generator and operable in conjunction with said first prime mover and generator for supplying electrical energy at substantially constant frequency to a variable load, automatically operative load-responsive means for insuring that said first prime mover and generator supplies substantially the entire energy requirements of said load at said constant frequency from a minimum up to a predetermined limiting maximum value of said load and said auxiliary prime mover and generator become operative to supply requirements of said load only in excess of said limiting value, and means automatically operative in response to the power available at the inlet of said first prime mover for varying the limiting value at which said auxiliary power source becomes operative.

5. In an electrical power system, a power source comprising a hydraulic turbine and a generator driven thereby, a second generator, means for driving said second generator, control means for said second generator, automatically operative means for rendering said control means substantially inoperative while the load on said system is below a predetermined limiting value and for insuring that said driving means supplies load requirements only in excess of said limiting value, and automatically operative means for varying said load limiting value in accordance with the power available for conversion at said hydraulic turbine.

6. In an electrical power system, a plurality of power sources each comprising a generator and means for driving said generator, control means for each of said driving means and automatically operative means for rendering the control of one of said driving means inoperative while the load on the system is below a predetermined limiting value and for rendering the control of said latter driving means operative and the control of the first driving means inoperative when the load on the system is above said limiting value.

7. In an electrical power system, a plurality of power sources each comprising a prime mover driving an electrical generator, control means for each of said prime movers, automatically operative load-responsive means for rendering the control of one prime mover inoperative while the load on the system is below a limiting value and for rendering the control of said latter prime mover operative and the control of the other prime mover inoperative when the load on the system is above a predetermined value, and automatically operative means responsive to a characteristic of the energy supplied to said first prime mover for varying said load limiting value.

8. In an electrical power system, a synchronous alternating current generator for supplying the load on said system, a prime mover for driving said generator, an auxiliary source of electrical power, means for regulating said auxiliary source to cause the latter to supply load requirements of said system under certain conditions, automatically operative means responsive to the load on the system for maintaining said auxiliary source substantially inoperative for the purpose of supplying power to said system while said load is below a predetermined limiting value and causing said auxiliary source to supply load requirements of said system only in excess of said limiting value, and means automatically operative in response to a characteristic of the energy available for conversion by said prime mover for varying said load limiting value.

9. In an electrical power system, a generator for supplying a load, a hydraulic turbine for driving said generator, automatically operative inlet controlling means for regulating a characteristic of the energy supplied by said turbine, an auxiliary source of electrical power for supplying said load, means for regulating a characteristic of the energy supplied by said auxiliary power source, and automatically operative load responsive means for causing the regulating means for said auxiliary source to be rendered inoperative while the power output of said generator is below a predetermined limiting value and for causing the controlling means of said turbine to be rendered inoperative with a predetermined maximum inlet opening maintained while the load on said system is above said limiting value, and automatically operative means responsive to variations in the effective head on said turbine for varying said load limiting value.

10. In an electrical power system, a hydroelectric unit, regulating means associated with the hydraulic turbine of said unit and operative to maintain a characteristic of the energy supplied by said unit substantially constant under conditions of variable load, an auxiliary source of electrical energy comprising a generator and a prime mover for driving the same, regulating means associated with said prime mover and adapted to maintain a characteristic of the electrical energy supplied by said auxiliary source substantially constant, controlling means responsive to the load on said system for rendering the regulating means of said prime mover inoperative and said auxiliary source ineffective to supply any appreciable energy to said system while the load therein is below a predetermined limiting value and for rendering the regulating means of said prime mover operative and the regulating means of said hydraulic turbine inoperative with a predetermined maximum inlet opening maintained when the load on said system is above said predetermined limiting value, said controlling means including instrumentalities for introducing a desired time-interval into the control of said regulating means, and automatically operative means responsive to the energy available at said hydraulic turbine for causing said load limiting value to vary directly as said available energy.

11. A hydro-electric installation, comprising a hydraulic turbine, means for automatically governing said turbine to insure its operation at a definite controlled speed, and means responsive to a condition attendant upon the operation of said turbine and operatively associated with said governing means for automatically adjusting the value of the maximum load that may be supplied during the operation of said turbine at said definite controlled speed.

12. A dynamo-electric power installation, comprising a prime mover, regulating means for controlling the supply of energy to said prime mover to insure its operation at a definite controlled speed to supply a load variable between approximately zero and a maximum limiting value, automatically operative means for limiting the maximum load on said prime mover to said limiting value, and means responsive to a condition attendant upon the operation of said installation for varying said load limiting value while permitting operation of said prime mover at said controlled speed.

13. In a hydro-electric installation, a hydraulic turbine supplied from a storage source of variable head, a generator adapted to be driven by said turbine, regulating means for controlling the speed of said turbine during variations in load thereon from a minimum to a predetermined maximum value, and float-controlled load responsive instrumentalities for causing the maximum limiting value of load that may be supplied by said turbine while operating at a predetermined controlled speed to be dependent upon the available supply in said storage source.

14. In an electrical power system, a prime mover, means for regulating the admission of operating fluid to said prime mover, means for controlling said regulating means to maintain the speed of said prime mover at a predetermined value under one normal operating condition wherein said prime mover supplies energy to said system, and means responsive to a condition attendant upon the supply of operating fluid available for conversion by said prime mover for substantially altering the controlling effect of said controlling means under another condition of operation of said prime mover wherein the latter supplies energy to said system.

15. In an electrical power system, a prime mover, means for regulating the admission of operating fluid to said prime mover, speed responsive means for controlling said regulating means to maintain the speed of said prime mover at a predetermined value under certain operating conditions wherein said prime mover supplies energy to said system, and means for rendering said controlling means ineffective for purposes of controlling said regulating means under another operating condition wherein said prime mover supplies energy to said system, said rendering means being remote controlled and electro-magnetically actuated automatically in response to variation in a condition attendant upon the operation of said prime mover.

16. In an electrical power system, a prime mover, a synchronous alternating current generator driven thereby and adapted to supply energy to said system, means for controlling the operation of said prime mover, said controlling means including instrumentalities for insuring operation of said prime mover at a definite speed, and means responsive at least in part to the electrical power supplied by said generator for limiting the maximum power which said prime mover and said generator may supply to said system, and means responsive to a condition attendant upon the operation of said system for automatically adjusting the maximum limiting value of the power which said prime mover and said generator may supply to said system during operation of said prime mover at said definite speed.

17. In an electrical power system, a prime mover, a synchronous alternating current generator driven thereby, means for controlling the admission of operating fluid to said prime mover, means for governing the degree of opening of said admission-controlling means, said governing means including speed responsive means for maintaining the speed of said prime mover and the frequency of the current of said generator of a predetermined value under normal operating conditions, and means responsive to the supply of operating fluid available for said prime mover for variably determining the maximum permissible degree of opening of said admission-controlling means while still permitting controlled operation of said prime mover and generator to supply electrical current of said frequency to said system.

18. In an electrical power system, a hydraulic turbine, a synchronous alternating current generator driven thereby, means for controlling the admission of water to said turbine, means for governing the degree of opening of said admission-controlling means, said governing means including speed responsive means for maintaining the speed of said prime mover and the frequency of the current of said generator at a predetermined value under normal operating conditions, load-responsive means operatively associated with said governing means and operative to limit the maximum degree of opening of said admission-controlling means while still permitting controlled operation of said prime mover and generator to supply power to said system, and means responsive to a condition attendant upon supply of water available for said turbine for regulating said limiting means.

19. A hydro-electric installation, comprising a hydraulic turbine, an alternating current synchronous generator driven by said turbine, means including devices responsive to the speed of said turbine for automatically governing said turbine to insure its operation at a constant speed and the supply of alternating current of constant frequency by said generator independently of the operation of any other source of alternating current energy, and means responsive to the available supply of water for said turbine for automatically adjusting a characteristic of the operation of said turbine during said speed controlled operation thereof.

In testimony whereof, the signature of the inventor is affixed hereto.

JOHN J. KANE.